UNITED STATES PATENT OFFICE.

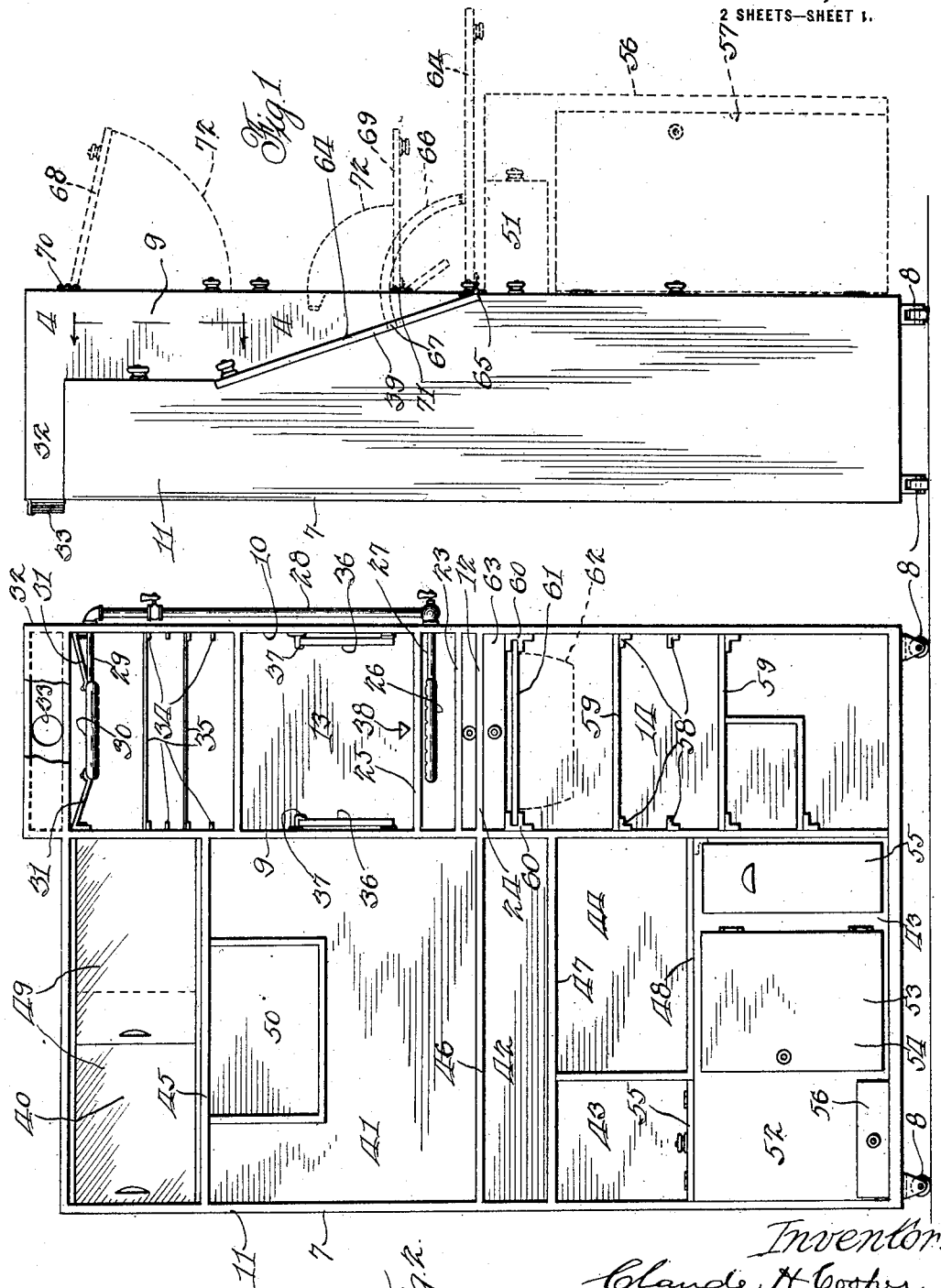

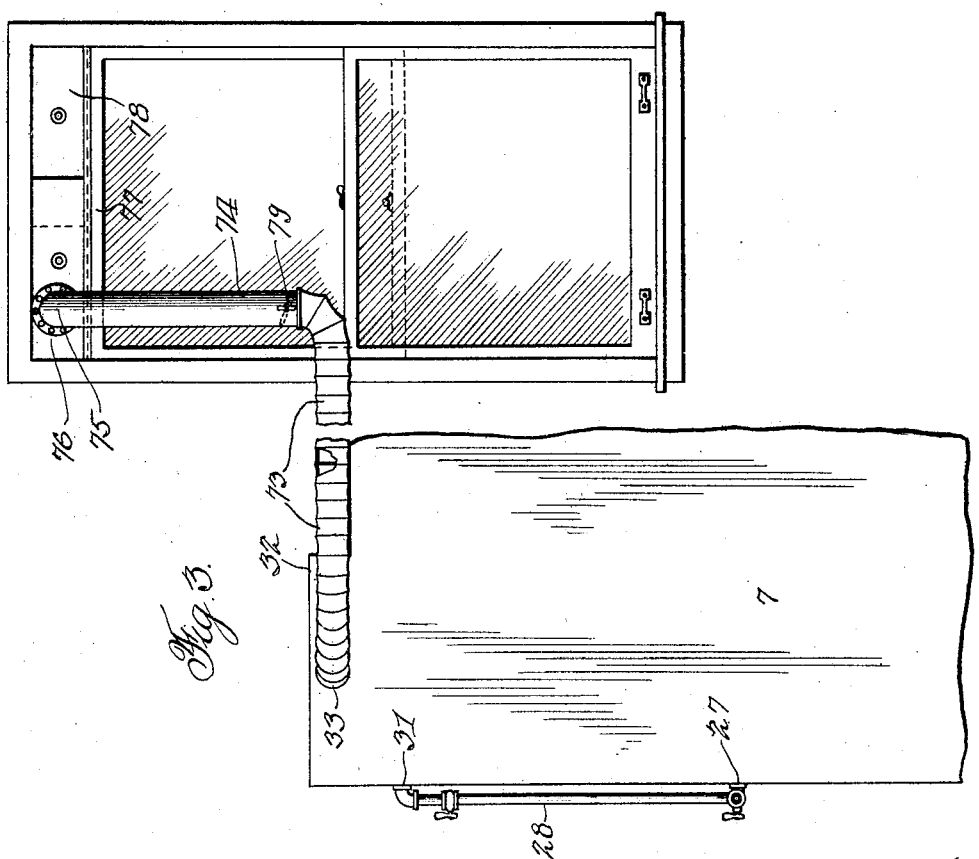

CLAUDE H. COOPER, OF YONKERS, NEW YORK.

KITCHENETTE-CABINET.

1,394,146.   Specification of Letters Patent.   Patented Oct. 18, 1921.

Application filed August 30, 1920. Serial No. 406,891.

*To all whom it may concern:*

Be it known that I, CLAUDE H. COOPER, a citizen of the United States, residing at Yonkers, in the county of Westchester and State of New York, have invented certain new and useful Improvements in a Kitchenette-Cabinet, of which the following is a specification.

This invention relates to improvements in house furnishings, and particularly to such furnishings employed for culinary, pantry and dining purposes, and it consists in certain peculiarities of the construction, novel arrangement, combination and operation of the various parts thereof as will be hereinafter more fully set forth and specifically claimed.

One of the objects of the invention is to provide in the form of a very compact and attractive unit, a sanitary, fire-proof, rodent-proof, and odorless cabinet for the purpose of holding or containing the necessary culinary and dining articles, including an oven or cooker and a table, provisions or articles of food sufficient for two persons for a period of about twenty four hours, ice for the proper refrigeration of said articles and utensils for preparing, cooking, and eating the food-stuffs, as well as, for heating water and washing dishes and kitchen utensils.

Another object is to so construct and arrange the different parts of the device or cabinet, that its compactness and the convenience of arrangement of its parts will adapt it for use in a very small room, such as a hall bed room, or closet, or other restricted confines or quarters, and so that, if desired, a meal may be prepared and eaten, and the dishes and utensils washed and cleared away without the user rising from a chair positioned beside the table of the cabinet.

A still further and important object is the provision in the cabinet of a cooker, by means of which boiling, roasting, baking, frying, and toasting can be readily and efficiently done by the use of gas, electricity, or oil.

Still another object is to furnish adjustable and detachable means for carrying away the odors and excess heat from the oven or cooker and discharging the same into the atmosphere.

Numerous other objects and advantages of the invention will be obvious from the following description and explanation.

In the accompanying drawings, which serve to illustrate an embodiment of the invention—

Figure 1 is a view in side elevation of a cabinet embodying the invention showing by continuous lines the outer doors thereof closed and by dotted lines, open.

Fig. 2 is a front face view of the cabinet with the outside doors removed.

Fig. 3 is a rear face view of a portion of the cabinet and an inside face view of a window frame illustrating an outlet pipe connected to the upper portion of the cabinet and leading through the upper portion of the window frame for the discharge of odors and heat from the oven or cooker of the cabinet, and Fig. 4 is a greatly enlarged vertical sectional view of one of the upright walls of the part of the cabinet constituting the oven thereof.

Referring now to the drawings, in which corresponding numerals of reference designate like parts throughout the different views thereof, the cabinet as a whole is indicated by the numeral 7 and may be made of any suitable size, form and material, but by preference exteriorly of pressed steel and of an upright oblong and substantially rectangular shape. Supporting the floor of the cabinet at each corner thereof is a caster 8 of the ordinary or well known construction which are employed to enable the device to be easily moved from one place to another.

As is clearly shown in Fig. 2 of the drawings, the hollow casing 7 is provided with an upright partition 9 which extends from the floor of the cabinet to a slight distance above the top thereof and is located at a point about one-third of the distance from the side wall 10 of the casing or cabinet to the other side wall 11 thereof. Within the vertical compartment provided by the partition 9 and side wall 10 and about midway between the top and bottom of said compartment is horizontally located a floor 12 which divides said main vertical compartment into two sub-compartments 13 and 14, the former being located directly above the latter.

The compartment 13 constitutes the oven of the cabinet and for the purpose of rendering it more efficient as an oven or cooking receptacle, its side wall 10, rear wall and the partition 9 are by preference each made up or composed of an inner lining 15 of corrugated metal, a layer of sheet iron 16 spaced from the corrugated lining 15 to form an air space 17, a sheet of asbestos 18 or other non-heat-conducting material interposed between another layer 19 of sheet iron and the outer wall 9 of steel. The arrangement of the parts of said walls are clearly shown in Fig. 4 of the drawings, and it is manifest that they can be held in their respective positions by means of rivets or bolts 21 extended therethrough and equipped with proper spacers 22 to hold the lining 15 at a suitable distance from the layer 16 of sheet iron for the purpose of forming the air space 17 and for holding the layer 19 of sheet iron on each of the side walls of the compartment at a suitable distance from the steel wall or member 20 for the purpose to be presently explained.

Located within the compartment 13 a slight distance above the floor or horizontal partition 12 is a grate-like frame 23 between which and the floor 12 is movably located a tray 24 of zinc or other suitable material to catch drippings which may fall from the upper portion of the oven or compartment 13. Horizontally located above the member 23 at a suitable distance therefrom is a grate 25 below which is horizontally disposed a gas burner 26 of any well known construction which has communication by means of a branch pipe 27 extended through the side wall 10 with another pipe 28 located vertically along said wall and having communication with a supply of gas or oil, not shown.

The upper end of the pipe 28 has leading therefrom a branch pipe 29 which communicates with a burner 30 supported by suitable brackets 31 in the upper portion of the compartment 13 but a slight distance below an upward extension 32 of said compartment which extension forms a fume and smoke collecting box or receptacle from which an outlet 33 is provided.

Each of the inner sides of the compartment 13 is provided with a series of spaced and inwardly extended projections 34 for horizontally supporting racks or grates 35 upon which articles of food may be placed when it is desired to broil the same by means of the heat from the burner 30. Hinged at its lower end to the inner surface of each of the side walls of the compartment 13 at a suitable distance from the grate 25 thereof is a plate 36 which are normally held in upright positions as shown in Fig. 2 by means of spring catches 37 extended inwardly from the said walls at proper points to engage the upper edges of said plates. By this arrangement it is apparent that when it is desired to use the oven for roasting or baking, one or both of the plates 36 can be detached from its catch 37 and placed so as to rest on a support 38 extended inwardly from the rear wall of the compartment 13 a slight distance above the grate 25, where they will be held in a horizontal position for the support of a pan or other cooking utensil.

By reference to Figs. 1 and 2 of the drawings, it will be seen that the wall or partition 9, as well as the side wall 10, is of greater width than the side wall 11 and also of slightly greater height. Besides, it will be observed in Fig. 1 that the front edge of the side wall 11 is downwardly and forwardly inclined as at 39 from a point some distance below the upper end of said wall to about the middle of its length. This arrangement provides an offset in the upper front portion of the cabinet, that is, the side wall 10 and the partition or wall 9 will extend forwardly a greater distance than the upper portion of the side wall 11, thus decreasing the area of the compartments located in the cabinet between the upper portions of the side wall 11 and the partition 9, thus preventing said compartments becoming unduly heated by their exposure to the adjacent wall of the oven. The wall or partition 9 and side wall 11 form a space which is divided into a number of compartments 40, 41, 42, 43, and 44 by means of horizontally disposed floors 45, 46, 47, and 48. The compartment 40 is for the reception of cups and dishes, and may be closed by means of a pair of overlapping slidable doors 49 mounted in a well known way in the front portion of said compartment. The shelf 45 has suspended therefrom within the compartment 41 a box-like compartment 50 for the reception of a drawer which may be divided into compartments to be used for sugar, coffee, tea, and the like. On the floor 46 of the compartment 41 may rest a bread and cake box and condiments of various kinds may be disposed thereon for ready access and use. In the compartment 42 a drawer 51, see Fig. 1, for the reception of table and kitchen linen and other articles, may be located.

In the lower portion of the compartment 43 and below the floor 48 of the compartment 44 is located an ice box 52 and a refrigerating receptacle 53 for such articles as milk, butter, cream, meats, and the like.

The refrigerating receptacle is provided at its front portion with a door 54 and the ice box 52 is provided at its top with a hinged cover 55 and in its bottom with a removable drip pan 56 to receive the drippings from the ice. A receptacle 55ª for vegetables can be placed in the lower portion of the compartment 43 and readily withdrawn therefrom when access thereto is desired.

The compartments 42, 43, and 44 are closed by means of a door 56, see Fig. 1, hinged to one of the side walls of the said compartments and the sub-compartment 14 of the vertical compartment between the partition 9 and side wall 10 is closed by means of a door 57 hinged at one of its edges to the wall 10 at proper points. The side wall of the sub-compartment 14 is provided with inwardly extended ribs or projections 58 on which removable shelves 59 may be placed for the support of cooking utensils of various kinds and it is obvious that these shelves may be adjusted with respect to one another by removing them from one pair of the projections 58 to another as may be desired.

At the upper portion of the sub-compartment 14 and on each side wall thereof is mounted a grooved guide 60 for the support of a frame 61 which may carry a wash bowl 62 which can be removed and used for washing dishes and other articles. Above the guide pieces 60 and below the floor 12 is slidably mounted a pastry board 63 which can be withdrawn sufficiently to enable it to form a flat board or support on which dough may be rolled out to a proper thickness and cut into desired shapes and sizes. The compartment 41 is closed by a door 64 which is secured by means of hinges 65 at its lower edge to the front edge of the floor 46 of the last named compartment. This door is provided, preferably, at each of its side edges with a brace rod 66 which are adapted to slide in opening and closing said door, within the space between the steel walls 9 and sheet iron plates 19 of the side walls of the oven or cooker. Each of the arms 66 may have at its inner end a catch 67 to engage suitable portions of the members 19 and 9 when the door 64 is turned to a horizontal position as shown by dotted lines in Fig. 1 of the drawings, for the purpose of affording a table, thus preventing said arms becoming detached from the members between which they operate and also affording means for supporting the door 64 in a horizontal position.

The means for closing the front of the compartment or oven 13 comprises two doors 65 and 69, the former being secured by means of hinges 70 to the upper portion of the frame of said compartment, and the latter door 69, by means of hinges 71 secured to the lower portion of the frame of said compartments. The doors 65 and 69 are of sufficient size to meet at their free ends when closed as shown by continuous lines in Fig. 1 of the drawings, and thus prevent the escape of heat and odors from the oven. Each of the doors 68 and 69 is provided at each of its side edges and at right angles thereto with a segmental wing or plate 72 which are adapted to operate within the spaces between the steel members 9 and sheet iron members 19 of each of the side walls of the oven 13 as will be readily understood by reference to Fig. 4 of the drawings. By using the wings or plates 72 on the doors 68 and 69 it is obvious that hood-like devices will be provided so that the upper door and its wings will have a tendency to prevent the escape of heat and odors into the room while the wings of the lower door 69 when the latter is extended as shown by dotted lines in the last named figure, will act as guards to prevent articles placed on the door 69 which may be used as an auxiliary table to the main table 64, being accidentally displaced or knocked off.

In Fig. 3 of the drawings I have shown a part of the rear portion or back wall of the cabinet and illustrated means for conducting excessive heat and fumes from the fume box 32 thereof out through a window of a room, and this means consists in employing a flexible and collapsible tube or pipe 73 which may be made of any suitable material, but preferably of gas-proof mask cloth supported internally by a series of spaced rings, and fitted at one of its ends over the outlet 33 of the fume box of the cabinet and at its other end to one end of a section 74 of a stove pipe which is provided at its other end with an elbow 75 extended through a suitable opening in a slidable panel 76 located between the upper rail 77 of the upper window sash and the top of the frame thereof.

In this space between the said rail of the window sash and the top of the frame is located another slidable panel 78 which overlaps the panel 76 in such a way that said panels may be adjusted to fit window frames of different widths. The section 74 of the stove pipe may be provided with a damper 79 of the usual construction to regulate the draft through the same as well as through the flexible pipe 73 with which it is connected.

From the foregoing and by reference to the drawings it will be readily understood that by my improvements, an exceedingly compact, useful, convenient, and attractive cabinet will be furnished, and that by reason of the offset construction above referred to with respect to the walls 11, 9 and 10, a cabinet, when the parts thereof are closed, will be provided which will have an appearance closely resembling that of a ladies' writing desk and book case.

While I have shown the oven or cooker equipped with gas fixtures for furnishing heat to the same, yet I desire it to be understood that suitable fixtures for the consumption of oil as a fuel, or fixtures adapted for the use of electricity may be substituted for the gas fixtures without departing from the spirit of the invention, and I desire it to be further understood that I do not wish to be limited to the exact construction and arrangement of the various compartments of the cabinet as it is apparent that numerous changes in their shapes and sizes and arrangements may be made without sacrificing any advantages of the invention.

Having thus fully described my invention, what I claim as new and desire to secure by Letters Patent is—

In a device of the class described, the combination with a substantially rectangular upright wheeled unitary cabinet or casing having a vertical partition spaced at a greater distance from one of its side walls than from its other side wall, said cabinet having at least a pair of compartments located one above the other in the narrow compartment formed by the said partition and the walls of the cabinet, a door hinged at its upper edge to the upper front portion of the narrow upper compartment on one side of the partition for vertical pivotal movement, and having at each of its side edges a wing to co-act with the walls of said narrow compartment for the guidance of smoke and fumes, another door hinged at its lower edge to the front lower portion of the last named compartment for vertical pivotal movement, and having at each of its side edges a wing to co-act with the walls of said narrow compartment to prevent lateral displacement of articles supported by the last named door when in its lowered position, a fuel burner located in the upper and lower portions of the last named compartment, means communicating with said burners to supply fuel thereto, means supported within the last named compartment above the lower burner thereof for the support of cooking utensils, and means mounted within the last named compartment below the upper burner for supporting articles to be cooked, the last named compartment having in its upper end a fume collecting receptacle provided with an outlet, a flexible pipe connected at one of its ends to said outlet, and leading at its other end to a point of discharge.

CLAUDE H. COOPER.